J. A. ROTHERHAM.

SHOW CASE.

APPLICATION FILED AUG. 7, 1913.

Reissued Feb. 2, 1915.

13,875.

Witnesses:
Oscar F. Hill
Ellen O. Spring

Inventor:
James A. Rotherham.
by Chas. F. Randall
Attorney.

THE NORRIS PETERS CO., PHOTO-LITHO., WASHINGTON, D. C

UNITED STATES PATENT OFFICE.

JAMES A. ROTHERHAM, OF REVERE, MASSACHUSETTS.

SHOW-CASE.

13,875. Specification of Reissued Letters Patent. Reissued Feb. 2, 1915.

Original No. 978,215, dated December 13, 1910, Serial No. 577,551. Application for reissue filed August 7, 1913. Serial No. 783,649.

*To all whom it may concern:*

Be it known that I, JAMES A. ROTHERHAM, residing at Revere, in the county of Suffolk and State of Massachusetts, have invented a certain new and useful Improvement in Show-Cases, of which the following is a specification, reference being had therein to the accompanying drawings.

This invention has for its object to provide a show case adapted to exhibit material such as popped corn, the material being continuously circulated within the case in a stream which rises in the central portion of the case and descends in the outward portion thereof giving the effect, in the case of popped corn, of corn rising from a corn popper, the same charge of corn being used indefinitely.

The invention consists in improvements which I will now proceed to describe and claim.

Figure 1:
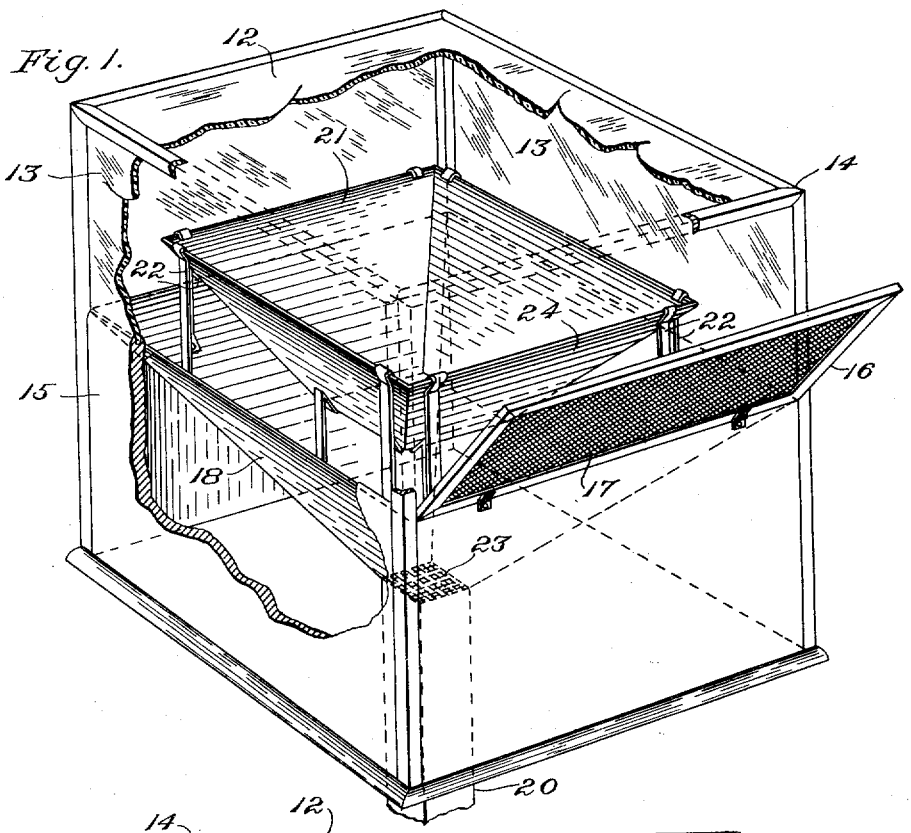
Figure 2:
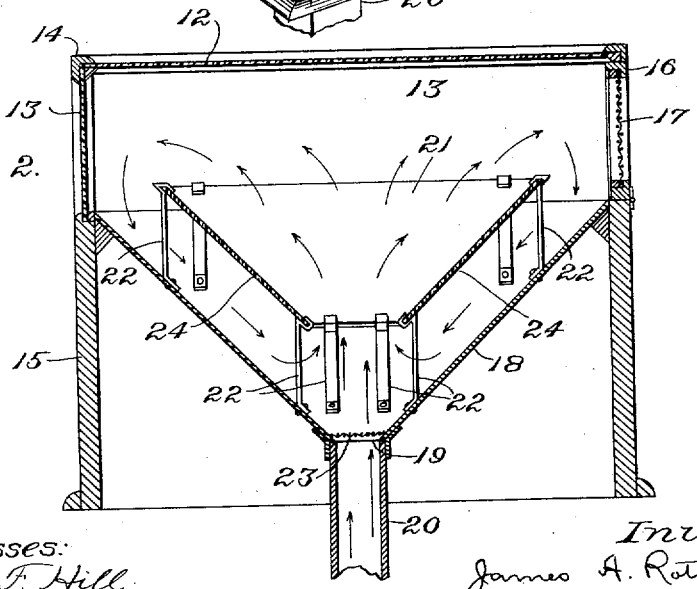

Of the accompanying drawings which form a part of this specification,—Figure 1 represents a perspective view of a show case embodying my invention, parts of the case being broken away. Fig. 2 represents a transverse vertical section of the case.

Similar reference characters indicate the same or similar parts in all the figures.

In carrying out my invention I provide a show case which is transparent to a sufficient extent to permit a free view of the contents of the case, the embodiment of my invention here shown including a rectangular case having top and side walls 12 and 13 of glass, supported by a suitable frame 14. The base portion 15 of the case is not necessarily transparent and may be of any suitable construction, although if desired, the glass walls 13 may be extended the entire height of the case. It is obvious, however, that parts of the upper portion of the case may be opaque.

As here shown, the case is provided at one end with a hinged door frame 16, the opening of which is filled by a sheet of wire cloth 17, adapted to permit the escape of air from the upper portion of the case, and to retain within the case the popped corn or other material which is circulated therein, as hereinafter described. The frame 16 and the filling 17 constitute an open guard and a movable closure, which permits the insertion of a charge of popped corn into the case. The bottom 18 of the operative portion of the case is hopper-shaped or flaring and is composed of walls which are inclined upwardly and outwardly from the depressed central portion of the bottom to the side walls of the case.

19, represents an air inlet through the depressed central portion of the bottom 18, said inlet being at one end of an air conduit 20, the other end of which may be connected with the casing of a blower or otherwise adapted to receive a blast of air under pressure, which blast passes from the inlet 19 upwardly into the central portion of the case.

21, represents a hopper-shaped or flaring conduit supported within the case, the inclined walls of the conduit being preferably parallel with the walls of the bottom 18 and separated therefrom by air spaces, the conduit being supported by legs or braces 22 which hold it suitably elevated above the bottom 18. The smaller depressed end of the conduit is located directly above the air inlet 19, and is preferably of larger area than said inlet, the larger upper end of the conduit being located below the top 12 of the show case.

The space surrounded by the conduit and the spaces between the conduit and the bottom 18, constitute endless passages through which a charge of popped corn inserted in the case is circulated, as indicated by the arrows in Fig. 2 by a blast of air entering the case through the inlet 19. The charge of corn accumulates by gravitation at the depressed central portion of the bottom 18 over the air inlet, where a guard 23 of wire cloth or other foraminous material is provided to prevent the corn from falling into the conduit 20. The blast of air passes upwardly through the conduit 21 and takes up the corn, carrying it through the conduit 21 into the upper portion of the show case where the corn falls outwardly and returns by gravitation to the lower portion of the bottom 18, the air escaping through the guard formed by the frame 16 and its foraminous filling 17, the latter preventing the escape of the corn with the air. The corn is circulated, in the manner described, continuously, so long as the air blast is maintained. The corn rising from the conduit 21 gives the effect of corn rising from a corn popper, so that the case constructed and operated as described constitutes a very attractive novelty, and effectively advertises the material circulated therein. To heighten the effect I employ mirrors for the walls 21, each wall having a reflecting upper surface which reflects the material passing through the conduit. The conduit 21 as here shown is composed of glass plates each having a reflecting coating 24, represented by the heavy black lines in Fig. 2, this coating being of the usual character employed in ordinary mirrors.

I claim:

1. A transparent show case having an air inlet at one side, internal means for causing a circulation in the case, of light material, such as popped corn, by a blast of air entering the case through said inlet, and means for preventing the escape of said material through the air inlet whereby the same charge of material may be displayed indefinitely.

2. A transparent show case having an air inlet at one side, and an internal conduit, the inner end of which is arranged to receive a blast of air passing from said inlet, while its outer end is arranged to deliver the blast into the outer portion of the case, the walls of the case and conduit forming endless passages through which popped corn or the like may be circulated by a blast of air entering the case through said inlet.

3. A transparent show case having a hopper-shaped bottom, an air inlet at the depressed central portion of said bottom; a hopper-shaped or flaring conduit within the case having a smaller end arranged to receive a blast of air entering the case and a larger end adjacent to the top of the case, the walls of the conduit being separated from the walls of the case by air spaces which coöperate with the space surrounded by the conduit in forming endless passages for the circulation of popped corn or the like by a blast of air entering the case through said inlet.

4. A transparent show case having an air inlet at one side, and an internal conduit, the inner end of which is arranged to receive a blast of air passing from said inlet, while its outer end is arranged to deliver the blast into the outer portion of the case, the walls of the case and conduit forming endless passages through which popped corn or the like may be circulated by a blast of air entering the case through said inlet, the case being provided with a guarded outlet for the escape of air and for the retention of the circulated material within the case.

5. A transparent show case having an air inlet at one side, and an internal conduit, the inner end of which is arranged to receive a blast of air passing from said inlet while its outer end is arranged to deliver the blast into the outer portion of the case, the walls of the case and conduit forming endless passages through which popped corn or the like may be circulated by a blast of air entering the case through said inlet, the air inlet being provided with a guard to prevent the circulated material from falling into it.

6. A transparent show case having an air inlet at one side, and an internal conduit, the inner end of which is arranged to receive a blast of air passing from said inlet while its outer end is arranged to deliver the blast into the outer portion of the case, the walls of the case and conduit forming endless passages through which popped corn or the like may be circulated by a blast of air entering the case through said inlet, the conduit being provided with reflecting surfaces which reflect the material passing through it.

7. A show-case having transparent inclosing walls, an air-inlet for admitting an upward blast of air for causing a circulation of light material such as popped corn, within the show case, provision for exit of the air from within the show case, and means for preventing escape of the said material through the inlet whereby the same charge of material may be displayed indefinitely.

In testimony whereof I affix my signature in presence of two witnesses.

JAMES A. ROTHERHAM.

Witnesses:
CHAS. F. RANDALL,
ELLEN O. SPRING.

Copies of this patent may be obtained for five cents each, by addressing the "Commissioner of Patents, Washington, D. C."